United States Patent [19]

Batruni

[11] Patent Number: 5,327,460
[45] Date of Patent: Jul. 5, 1994

[54] METHOD AND APPARATUS FOR FILTERING POST DECISION FEEDBACK EQUALIZATION NOISE

[75] Inventor: Roy G. Batruni, Fremont, Calif.

[73] Assignee: National Semiconductor Corporation, Santa Clara, Calif.

[21] Appl. No.: 910,009

[22] Filed: Jul. 7, 1992

[51] Int. Cl.$^5$ .......................... H03H 7/30; H03D 1/04
[52] U.S. Cl. .......................... 375/14; 375/99
[58] Field of Search ................. 375/11, 14; 364/724.19

[56] References Cited

U.S. PATENT DOCUMENTS

| | | | |
|---|---|---|---|
| 4,583,234 | 4/1986 | Ramadan | 375/11 |
| 4,856,031 | 8/1989 | Goldstein | 375/118 |
| 4,972,433 | 11/1990 | Yamaguchi et al. | 375/12 |
| 5,008,903 | 4/1991 | Betts et al. | 375/60 |

OTHER PUBLICATIONS

IEEE Communications Magazine, Shahid Qureshi, Mar. 1982 on p. 13, FIG. 12.

Primary Examiner—Stephen Chin
Assistant Examiner—Kevin Y. Kim
Attorney, Agent, or Firm—Limbach & Limbach

[57] ABSTRACT

A method and apparatus for compensating for post-decision feedback equalization noise during decision feedback equalization. The method includes the steps of performing decision feedback equalization on a noisy signal, while isolating noise components of the noisy signal and filtering the isolated noise components to generate post-decision feedback equalization noise having desired spectrum and power. Preferably, the noisy signal is pre-filtered in a feedforward filter and the isolated noise components are filtered to compensate for noise enhancement that has resulted from filtration in the feedforward filter. The apparatus of the invention is a decision feedback equalizer including a quantizer and a noise filter circuitry for controlling the spectrum and power of the noise component of the signal received by the quantizer. The noise filter preferably has a transfer function $B(z)/C(z)$, and the z-domain coefficients $e'(z)$ of the noise received by the quantizer are $e'(z)=[B(z)/C(z)]e(z)$, where $e(z)$ are the z-domain coefficients of the noise input to the noise filter circuitry. The noise filter circuitry preferably includes two filters whose transfer functions are $B(z)$ and $C(z)$, respectively, and the coefficients of $B(z)$ and $C(z)$ are selected to control the spectrum and power of the noise which interferes with the signal received by the quantizer. One class of embodiments employs a dummy quantizer to isolate the input noise received by a first filter of the noise filter circuitry.

12 Claims, 6 Drawing Sheets

METHOD AND APPARATUS FOR FILTERING POST DECISION FEEDBACK EQUALIZATION NOISE

FIELD OF THE INVENTION

The invention relates to electronic circuitry for performing decision feedback equalization, and to decision feedback equalization methods. More particularly, the invention relates to methods and apparatus for compensating for noise components of signals undergoing decision feedback equalization.

BACKGROUND OF THE INVENTION

Throughout this specification including the claims, the terms "post-decision feedback equalization noise" and "post-DFE noise" denote noise components of signals undergoing decision feedback equalization (before or after the decision feedback equalization operation has converged).

Also throughout this specification including in the claims, the terms "symbol" and "data symbol" are used to denote any characteristic of a signal. Examples of data symbols include amplitude of a digital voltage signal (whose amplitude can have any of a set of discrete values), phase of an electrical current signal, or an amplitude of a Fourier component of an electrical voltage pulse.

An inherent problem with transmission of data over a communication channel is that distortion and additive noise tend to interfere with proper reception of the transmitted data. Distortion during transmission of data pulses alters the received data symbols (e.g., the received pulse shape of each data pulse). This causes each symbol to interfere with several adjacent symbols, which inhibits the receiver from performing symbol detection and timing recovery. Additive noise further degrades the ability of the receiver to distinguish between received symbol levels.

Conventional receiver filtering techniques can counter distortion and additive noise effects to provide good symbol decision capability. For example, one type of conventional receiver (shown in FIG. 1) includes a linear feedforward filter followed by a nonlinear decision feedback equalizer (DFE). Conventional DFE circuits are nonlinear, due to quantizer circuitry therein which performs symbol decisions in the DFE feedback loop.

In the conventional circuit of FIG. 1, input signal s(n) has a z-domain representation s(z) (the parameter "n" can represent time, and "z" can represent frequency). Input signal coefficients s(z) propagate through the transmission channel identified as filter 2, which has z-domain transfer function H(z). Filter 2 typically has unknown characteristics. After propagating through the transmission channel (i.e., after being filtered by filter 2), the input signal is filtered by receive filter 4, which has z-domain transfer function R(z). As indicated in FIG. 1, the combined transfer function of filter 2 and receive filter 4 is A(z), and coefficients "t(z)" are the z-domain response of the combination of filters 2 and 4 to input coefficients s(z).

Additive noise (identified as "u(z)" in FIG. 1) typically becomes associated with the input signal during propagation through the transmission channel. To reflect this phenomenon, FIG. 1 indicates the presence of noise u(z) at the input of receive filter 4, and identifies the response of filter 4 to additive noise u(z) as filtered noise "w(z)." The combined response of filter 4 to noise u(z) and to filter 2's response to signal s(z) is identified as "x(z)" in FIG. 1. Combined response x(z) undergoes further processing (decision feedback equalization) in DFE components 8, 10, 12, and 14 of the FIG. 1 apparatus. Although FIG. 1 represents generation of combined response x(z) by summation of filtered noise w(z) with response t(z), it should be appreciated that an actual physical implementation of the FIG. 1 apparatus would include a single filter 4 whose single output x(z) has components w(z) and t(z), and that an actual physical implementation of the FIG. 1 apparatus would not include an actual summation circuit for summing together two distinct signals (corresponding to w(z) and t(z)) to generate response x(z).

As indicated in FIG. 1, the decision feedback equalization of response x(z) includes the steps of processing response x(z) in subtraction circuit 8, followed by processing of the output of circuit 8 in quantization circuit 10 and subtraction circuit 14, and generation of feedback coefficients x'(z) in filter 12 for subtraction from response coefficients x(z) in subtraction circuit 8.

To make the following description more definite, input signal s(n) is assumed to be a pulse whose amplitude can have only certain discrete values, i.e., the amplitude of s(n) is a member of a set of L discrete values $Q = \{q_1, q_2, \ldots, q_L\}$ for each value of "n." In response to such an input signal, the output signal x(n), having z-domain coefficients x(z), has the following form:

$$x(n) = \sum_{j=0}^{M+P-1} a_j s(n-j) + \sum_{k=0}^{P-1} r_k u(n-k) r_k$$

where the first summation represents signal t(n) (whose z-domain representation is t(z)), the second summation represents noise w(n) (whose z-domain representation is w(z)), M is the number of z-domain coefficients of transfer function H(z) of filter 2, and P is the number of z-domain coefficients of transfer function R(z) of receive filter 4. The first coefficient $a_0 s(n)$ of the first summation is indicative of input signal s(n). The other coefficients of the first summation represent intersymbol interference. Coefficients $r_k$ of receive filter 4 can be determined adaptively, or by some fixed criteria that determine one or more pulse shape characteristics.

The function of DFE loop components 8, 10, 12, and 14 of FIG. 1 is to cancel the inter-symbol interference and perform symbol detection (to generate a replica s'(n) of input signal s(n)). Practical embodiments of this DFE circuitry will equalize the lowest N z-domain coefficients of signal x(n), where N<M+P, while approximating the first N of above-mentioned coefficients $a_j$. In such embodiments, the DFE circuitry can equalize part but not all of the response t(z) to combined filters 2 and 4. After the DFE circuitry has converged to a final version of replica signal s'(n), such final version of signal s'(n) will satisfy the following relationship: $s'(n) - a_0 s(n) = e(n) = w(n)$. In other words, the final version of signal s'(n) will differ from a scaled version of input signal s(n) by error signal e(n), where e(n) has z-domain coefficients e(z) which satisfy e(z)=w(z), where w(z) are the z-domain coefficients of filter 4's response to additive noise u(n). Before the DFE circuitry reaches convergence, quantizer 10 outputs (during each feedback iteration) replica coefficients s'(z), which in turn cause circuit 14 to generate error components e(z) of an error signal e(n) which satisfies $e(n)=v(n)+(n)$ where $v(n)$ represents residual inter-symbol interference and $w(n)$ is a filtered additive error signal having z-domain coefficients $w(z)$.

We next describe the operation of conventional DFE circuitry 8, 10, 12, and 14 in greater detail, with reference to FIG. 1.

In subtraction circuit 8, feedback coefficients $x'(z)$ (replicas of coefficients $x(z)$ generated by filter 12 in a manner to be described below) are subtracted from signal $x(z)$ to generate difference coefficients $y(z)=x(z)-x'(z)$. Quantization circuit 10 processes difference coefficients $y(z)$ to generate replica coefficients $s'(z)$ which define a replica signal $s'(n)$ whose value is the member of the set $\{q_k; k=1, 2, \ldots, L\}$ which best approximates input signal $s(n)$.

Replica coefficients $s'(z)$ are subtracted from coefficients $y(z)$ in subtraction circuit 14 (after coefficients $y(z)$ are multiplied by coefficient $a_0$ by means within circuit 14), to generate above-mentioned error coefficients $e(z)$. In an embodiment in which filter 12 is an adaptive filter, replica coefficients $s'(z)$ and error coefficients $e(z)$ are fed back to filter 12. In response, filter 12 applies adaptively generated transfer function $A'(z)$ to coefficients $x(z)$, to generate a set of replica coefficients $x'(z)$ during each iteration of the DFE operation. Error coefficients $e(z)$ can thus be used to implement adaptive convergence and continuous coefficient updating within filter 12.

In other embodiments in which filter 12 has a predetermined transfer function $A'(z)$ which matches the transfer function $A(z)$, only coefficients $s'(z)$ are fed back to filter 12, and in response to coefficients $s'(z)$ only, filter 12 generate a set of replica coefficients $x'(z)$ during each iteration of the DFE operation.

The present invention pertains to methods and apparatus for controlling (compensating for) the error coefficients $w(z)$ which remain after the conventional apparatus of FIG. 1 has converged (as mentioned above, $e(z)=w(z)$ at convergence).

Both before and after convergence, the power spectrum and power of a residual error signal generated during DFE processing depends not only on the unequalized channel coefficients $v(z)$ convolved with the symbol alphabet $\{q_k\}$, but also on receive-filtered noise coefficients $w(z)$ (which are receive filter 4's response to additive noise $u(z)$). The inventor has recognized the desirability of controlling the coefficients $w(z)$, primarily due to the following reasons.

A receive filter (such as receive filter 4 of FIG. 1) that is employed to process input data in a decision feedback equalizer will sometimes be referred to herein as a "feedforward" filter. A feedforward filter is typically designed to perform pulse shaping functions such as decreasing the rise time of each input pulse which it receives (for timing recovery purposes), or suppressing the tail of each input pulse which it receives to enable minimization of the number (N) of coefficients of a filter in a DFE feedback loop (e.g., filter 12 of FIG. 1). However, it is usually not possible for a practical feedforward filter to achieve such pulse shaping objectives while also achieving desired noise filtering objectives. For example, a high pass feedforward filter which sharpens the leading edge of a received pulse will also undesirably increase the power of the associated noise (assuming the noise is white noise or high frequency noise).

The present invention permits a feedforward filter (used with a decision feedback equalizer) to be implemented with a simple design for achieving desired pulse shape and length, while also controlling the residual noise present during decision feedback equalization. The invention accomplishes this by filtering the noise components of signals undergoing decision feedback equalization, for example to compensate for noise enhancement that has undesirably resulted from pulse shaping by the feedforward filter.

SUMMARY OF THE INVENTION

The invention is a method and apparatus for compensating for post-decision feedback equalization noise (post-DFE noise) during decision feedback equalization. The method of the invention includes the steps of: (a) performing decision feedback equalization on a noisy signal; and (b) while performing step (a), isolating noise components of the noisy signal and filtering the isolated noise components to generate post-DFE noise having desired spectrum and power. In preferred embodiments, the noisy signal is filtered prior to step (a) in a feedforward filter, and the isolated noise components are filtered to compensate for noise enhancement that has resulted from filtering the noisy signal in the feedforward filter.

The apparatus of the invention is a decision feedback equalizer including a quantizer and a noise filter means for controlling the spectrum and power of the post-DFE noise component ($e'(n)$) of the signal ($y'(n)$) received by the quantizer. In a class of embodiments, the noise filter means has a transfer function $B(z)/C(z)$, so that the z-domain coefficients $e'(z)$ of post-DFE noise $e'(n)$ satisfy the relation $e'(z)=[B(z)/C(z)]e(z)$, where $e(z)$ are the z-domain coefficients of the noise $e(n)$ input to the noise filter means.

The noise filter means preferably includes two filters whose transfer functions are $B(z)$ and $C(z)$, respectively. The coefficients of $B(z)$ and $C(z)$ are selected to control the spectrum and power of the post-DFE noise which interferes with signal $y'(n)$ received by the quantizer. Some embodiments employ a dummy quantizer to isolate the input noise received by a first filter of the noise filter means, where the first filter has transfer function $B(z)=1+b_1(z)^{-1}+b_2(z)^{-2}+\ldots+b_{n1}(z)^{-n1}$, and a second filter of the noise filter means has transfer function $C(z)=1+c_1(z)^{-1}+c_2(z)^{-2}+\ldots+c_{n2}(z)^{-n2}$. In other embodiments that do not employ a dummy quantizer to isolate the input noise received by the first filter, the first filter has transfer function $zB'(z)=b_1+b_2(z)^{-1}+\ldots+b_{n1}(z)^{-(n1)+1}$, and the second filter has transfer function $C'(z)=c_0+c_1(z)^{-1}+c_2(z)^{-2}+\ldots+c_{n2}(z)^{-n2}$.

DETAILED DESCRIPTION OF THE PREFERRED EMBODIMENTS

A first preferred embodiment of the invention 5 will be described with reference to FIG. 2. Subtraction circuit 8 of FIG. 2 (which is identical to subtraction circuit 8 of FIG. 1) receives the same set of z-domain coefficients x(z) as are received by subtraction circuit 8 of FIG. 1. Thus, coefficients x(z) represent the response of a feedforward filter having transfer function R(z) to a signal having the following two components: signal s(n) whose value is a member of the set $\{q_k; k=1, 2, \ldots, L\}$ for each parameter n, and which has propagated through a transmission channel having transfer function H(z); and noise u(n).

Figure 1:
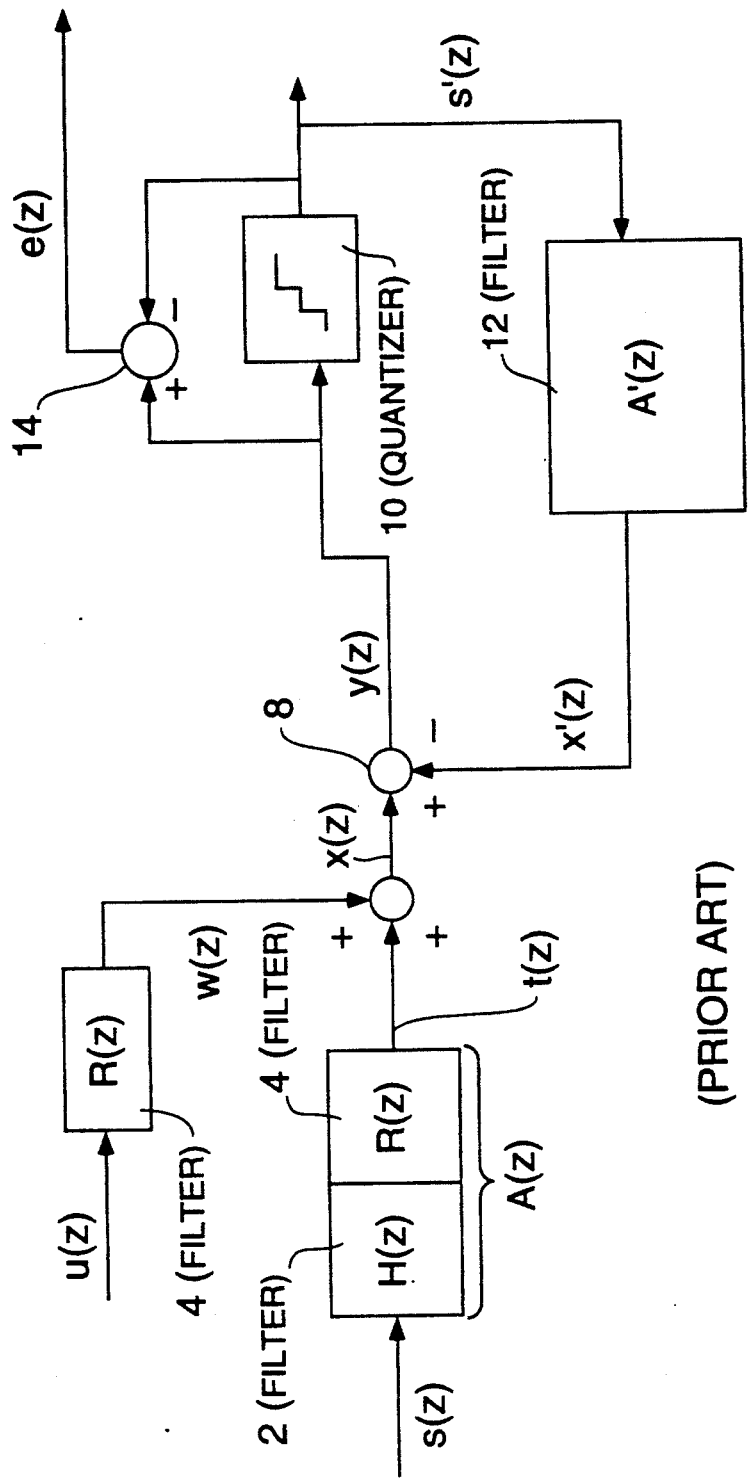
FIG. 1 is a block diagram of a conventional decision feedback equalizer circuit.

Dummy quantizer 30 (sometimes referred to as dummy "slicer" 30) and subtraction circuit 32 are identical to corresponding circuits 10 and 14 of FIG. 1. Dummy quantizer 30 receives the same coefficients y(z) as are received by quantizer 10 in FIG. 1, and performs symbol decision on coefficients y(z) to generate the same replica coefficients s'(z) as are generated by quantizer 10 of FIG. 1. Subtraction circuit 32 subtracts coefficients s'(z) from coefficients y(z) to generate the same error coefficients e(z) as are generated by subtraction circuit 14 of FIG. 1.

The error signal e(n) determined by coefficients e(z) is then filtered by noise filter 34 (which has transfer function B(z)) to generate filtered noise coefficients e1(z)=B(z)e(z). In an embodiment in which transfer function B(z) has form:

$$B(z)=b_1(z)^{-1}+b_2(z)^{-2}+ \ldots +b_{n1}(z)^{-1},$$

the n-domain signal e1(n) defined by coefficients e1(z) has form:

$$e1(n) = \sum_{j=1}^{n1} b_j e(n - j)$$

The coefficients e1(z) asserted at the output of noise filter 34 are added to coefficients y(z) from circuit 8 within addition/subtraction circuit 28, in order to compensate for noise in the coefficients y(z).

A second set of filtered error coefficients e2(z) is subtracted from coefficients y(z) in addition/subtraction circuit 28 while corresponding coefficients e1(z) are added to coefficients y(z) therein, to generate coefficients y'(z) which are output from circuit 28. Filtered error coefficients e2(z) are generated in the following manner.

The output, y'(z), of circuit 28 is received by quantizer circuit 20 and subtraction circuit 24. Quantizer circuit 20 and subtraction circuit 24 are identical to corresponding circuits 10 and 14 of FIG. 1. Quantizer 20 performs a symbol decision operation on coefficients y'(z) to generate replica coefficients s"(z). Replica coefficients s"(z) define a replica signal s"(n) whose value is the member of the set $\{q_k; k=1, 2, \ldots, L\}$ which best approximates input signal s(n).

Replica coefficients s"(z) are fed back to filter 22. In response, filter 22 generates replicas x'(z) of coefficients x(z). Quantizer 20 and filter 22 respectively generate a set of coefficients s"(z) and x'(z) during each of a number of iterations. The iterations continue until the decision feedback equalization process converges.

The replica coefficients s"(z) generated during each iteration are subtracted from coefficients y'(z) in subtraction circuit 24 (after coefficients y'(z) are multiplied by coefficient $a_0$), to generate error coefficients e'(z) ("post-DFE noise" coefficients). The resulting post-DFE noise signal e'(n) having z-domain coefficients e'(z) is filtered by noise filter 36 (which has transfer function C(z)) to generate filtered noise coefficients e2(z)=C(z)e'(z). In an embodiment in which transfer function C(z) has form:

$$C(z)=c_1(z)^{-1}+c_2(z)^{-2}+ \ldots +c_{n2}(z)^{-n2},$$

the n-domain signal e2(n) having coefficients e2(z) has form:

$$e2(n) = \sum_{j=1}^{n2} c_j e'(n - j).$$

The coefficients e2(z) output from noise filter 36 during each DFE iteration are subtracted from coefficients y(z) in addition/subtraction circuit 28 while above-described coefficients e1(z) are added to coefficients y(z) in circuit 28.

As a result, a signal y'(n), which has z-domain coefficients y'(z), is output from circuit 28. Signal y'(n) has form $$\begin{aligned} y'(n) \text{ has form } y'(n) &= y(n) + e1(n) - e2(n) \\ &= a_0 s(n) + e'(n) \end{aligned}$$

where post-DFE noise e'(n) has form $$e'(n) = e(n) + \sum_{j=1}^{n1} b_j e(n - j) - \sum_{j=1}^{n2} c_j e'(n - j)$$

In the z-domain, the components e'(z) corresponding to post-DFE noise e'(n) satisfy the equation e'(z)=[B(z)/C(z) ]e(z).

The coefficients of transfer functions B(z) and C(z) are selected to control the spectrum and power of the noise (e'(n)), which interferes with signal y'(n) received by quantizer 20.

Consider the case that the noise process e(z) can accurately be approximated by white noise $e_w(z)$ driving a filter E(z), in which case: $e(z)=e_w(z)E(z)=e_w(-Z)E_N(Z)/E_D(Z)$, and $e'(z)=e_w(z) [E_N(z)B(z)]/[E_D(Z)C(Z)]$. In this case, if B(z) and C(z) are selected to satisfy $B(z)=E_D(Z)$ and $C(z)=E_N(Z)$, then e'(z) will satisfy $e'(z)=e_w(Z)$. In this way, the post-DFE noise portion of signal y'(n) is completely whitened in accordance with the invention.

Given knowledge of the characteristics of noise $e(z)$, those of ordinary skill in the art can readily design or select noise filters 34 and 36 (in the FIG. 2 embodiment) which have appropriate transfer functions $B(z)$ and $C(z)$ for countering undesirable spectral properties and power of noise $e(z)$. Alternatively filters 34 and 36 are adaptive filters, in a class of embodiments of the invention particularly useful for countering potentially undesirable (but a priori unknown) spectral properties and power of noise $e(z)$.

Figure 2:
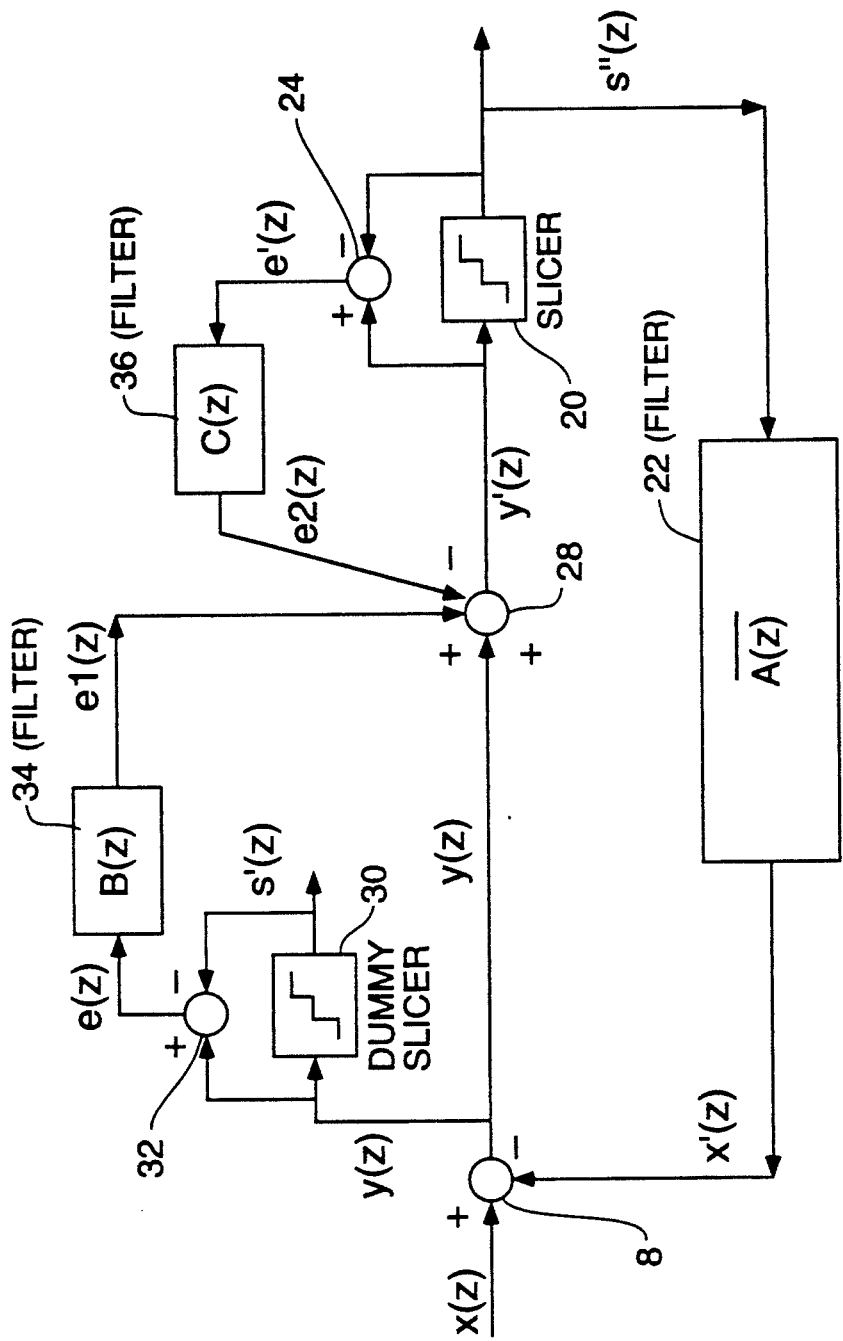
FIG. 2 is a circuit diagram of a preferred embodiment of the inventive circuit.

In a class of embodiments of the FIG. 2 apparatus, $B(z)=1+b_1(z)^1+b_2(Z)^{-2}+\ldots +b_{n1}(Z)^{-n1}$ and $C(z)=1+c_1(z)^{-1}+c_2(Z)^{-2}+\ldots +C_{n1}(Z)^{-n1}$, and the coefficients $b_i$ and $c_i$ are selected to control the spectrum and power of noise $e'(n)$. The restriction that the first coefficient of each of transfer functions $B(z)$ and $C(z)$ equals one constrains the degree of control that can be exercised by filters 34 and 36. If $c_1$ through $c_{n2}$ are equal to zero (so that transfer function $C(z)=1$), filters $B(z)$ and $C(z)$ act together as a finite impulse response (fir) filter $B(z)/C(z)=B(z)$. If $b_1$ through $b_{n1}$ are equal to zero (so that transfer function $B(z)=1$), filters $B(z)$ and $C(z)$ act together as an infinite impulse response filter $B(z)/C(z)=1/C(z)$. In this latter case, dummy quantizer 30 can be omitted (as in the FIG. 3 embodiment to be discussed below).

In the case that the DFE tail is equal in length to the receive channel tail (i.e., when $N=M+P$, where filter 22 has N coefficients and $x(z)$ is a set of $M+P$ coefficients), then the FIG. 2 apparatus is capable of cancelling all intersymbol interference. In this case, when the FIG. 2 circuit has reached convergence, residual noise component $e(z)$ satisfies $e(z)=w(z)=u(z)R(z)$, where $w(z)$, $u(z)$, and $R(z)$ have been defined above with reference to FIG. 1. Therefore, $e'(z)=u(z)R(z)[B(z)/C(z)]$, and the coefficients of filters 34 and 36 should be selected to satisfy $C(z)=R(z)$ and $B(z)=1$ in order to allow complete removal of all noise gain introduced by the receive (feedforward) filter $R(z)$.

In general, if parameters n and z correspond to time and frequency, respectively, and noise $e(z)$ consists of low frequency components, then the coefficients of filters 34 and 36 should be selected so that filters 34 and 36 function together as a high pass filter $B(z)/C(z)$.

Another preferred embodiment of the invention will be described next with reference to FIG. 3. Subtraction circuit 8 of FIG. 3 (which is identical to subtraction circuit 8 of FIG. 1) receives the same set of z-domain coefficients $x(z)$ as are received by subtraction circuit 8 of FIGS. 1 and 2. These coefficients $x(z)$ represent the response of a feedforward filter having transfer function $R(z)$ to a signal having the following two components: a signal $s(n)$ whose value for each parameter n is a member of the set of discrete values $\{q_k; k=1, 2, \ldots, L\}$, and which has propagated through a transmission channel having transfer function $H(z)$; and noise $u(n)$.

Figure 3:
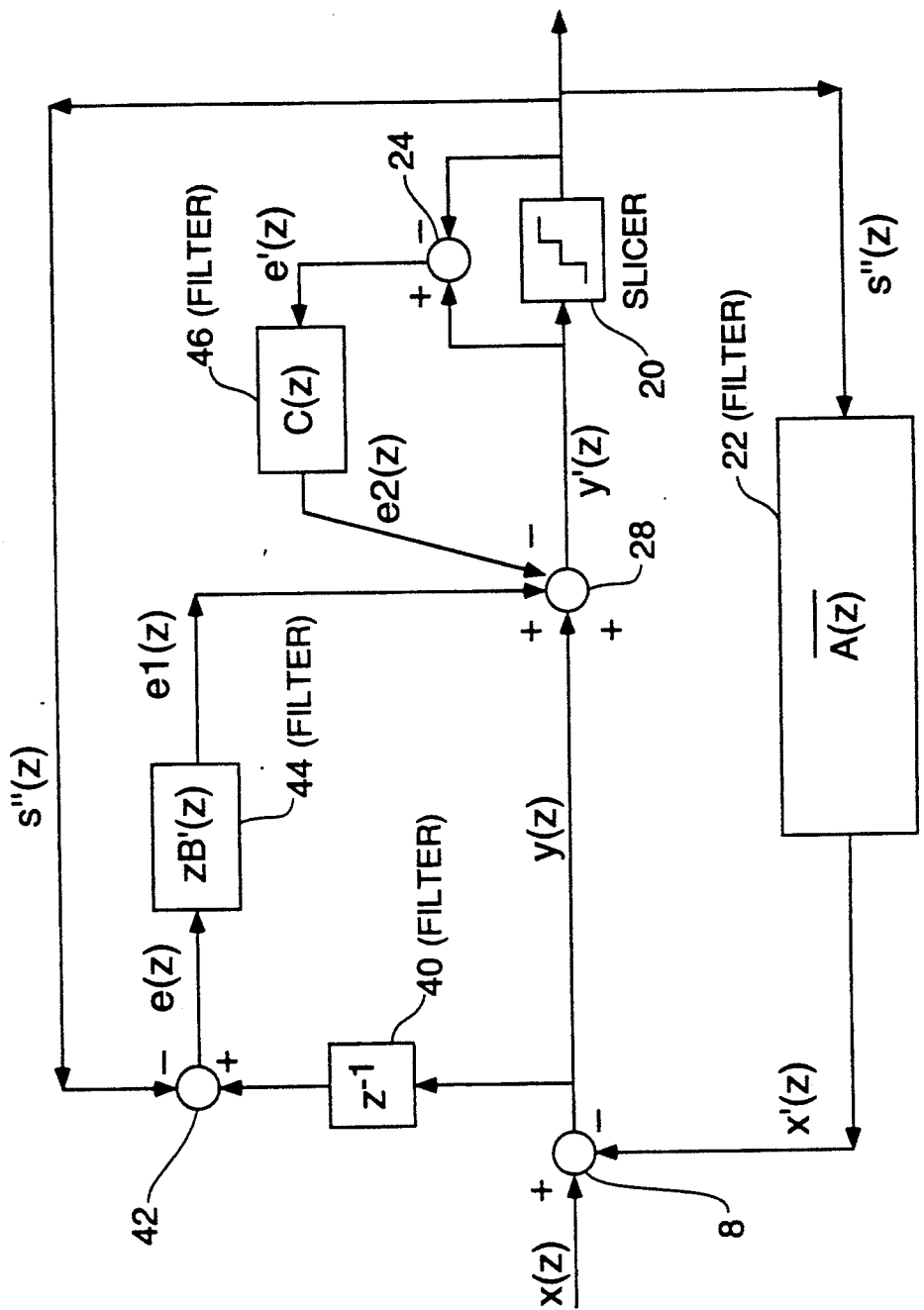
FIG. 3 is a circuit diagram of a second preferred embodiment of the inventive circuit.

In FIG. 3, addition/subtraction circuit 28, quantizer 20, subtraction circuit 24, and filter 22 are identical to the corresponding, identically numbered components in FIG. 2.

In FIG. 3, filter 40 has transfer function $1/z$ (and thus introduces a phase delay to the signal received at its input). Filter 40 filters coefficients $y(z)$, and supplies the resulting filtered coefficients to subtraction circuit 42. Circuit 42 subtracts the replica signal having coefficients $s''(z)$ (from quantizer 20) from the signal output from filter 40 to generate a noise signal $e(n)$ having coefficients $e(z)$. The noise signal $e(n)$, sometimes referred to as an error signal, determined by coefficients $e(z)$ is then filtered by noise filter 44. Filter 44 has transfer function $zB'(z)=b_1+b_2(z)^{-1}+\ldots +b_{n1}(Z)^{-(n1)+1}$. The filtered noise coefficients asserted at the output of filter 44 are $e1(z)=zB'(z)e(z)=b_1e(z)+b_2(z)^{-1}e(z)+\ldots +b_{n1}(z)^{-(n1)+1}e(z)$.

The coefficients $e1(z)$ asserted at the output of noise filter 44 are added to coefficients $y(z)$ from circuit 8 within addition/subtraction circuit 28.

A second set of filtered error coefficients $e2(z)$ is subtracted from coefficients $y(z)$ in addition/subtraction circuit 28 while corresponding coefficients $e1(z)$ are added to coefficients $y(z)$ therein, to generate coefficients $y'(z)$ which are output from circuit 28. Filtered error coefficients $e2(z)$ are generated in the following manner.

The output $y'(z)$, of circuit 28 is received by quantizer circuit 20 and subtraction circuit 24. Quantizer 20 performs a symbol decision operation on coefficients $y'(z)$ to generate replica coefficients $s''(z)$. Replica coefficients $s''(z)$ define a replica signal $s''(n)$ whose value is the member of the set $\{q_k; k=1, 2, \ldots, L\}$ which best approximates input signal $s(n)$.

Replica coefficients $s''(z)$ are fed back to filter 22. In response, filter 22 generates replicas $x'(z)$ of coefficients $x(z)$. Quantizer 20 and filter 22 respectively generate a set of coefficients $s''(z)$ and $x'(z)$ during each of a number of iterations. The iterations continue until the decision feedback equalization process converges.

The replica coefficients $s''(z)$ generated during each iteration are subtracted from coefficients $y'(z)$ in subtraction circuit 24 (after coefficients $y'(z)$ are multiplied by coefficient a0), to generate error coefficients $e'(z)$. The resulting post-DFE noise signal $e'(n)$ having z-domain coefficients $e'(z)$ is filtered by noise filter 46 (which has transfer function $C'(z)$) to generate filtered noise coefficients $e2(z)=C'(z)e'(z)$. Transfer function $C'(z)$ preferably has form $C'(z)=c_0+c_1(z)^{-1}+c_2(Z)^{-2}+\ldots + c_{n2}(z)^{-n2}$.

Given knowledge of the characteristics of noise $e(z)$, those of ordinary skill in the art can readily design or select noise filters 44 and 46 (in the FIG. 2 embodiment) which have appropriate transfer functions $zB'(z)$ and $C'(z)$ for countering undesirable spectral properties and power of noise $e(z)$. Alternatively, filters 44 and 46 are adaptive filters in a class of embodiments of the invention particularly useful for countering undesired (but a priori unknown) spectral properties and power of noise $e(z)$.

Figure 4:
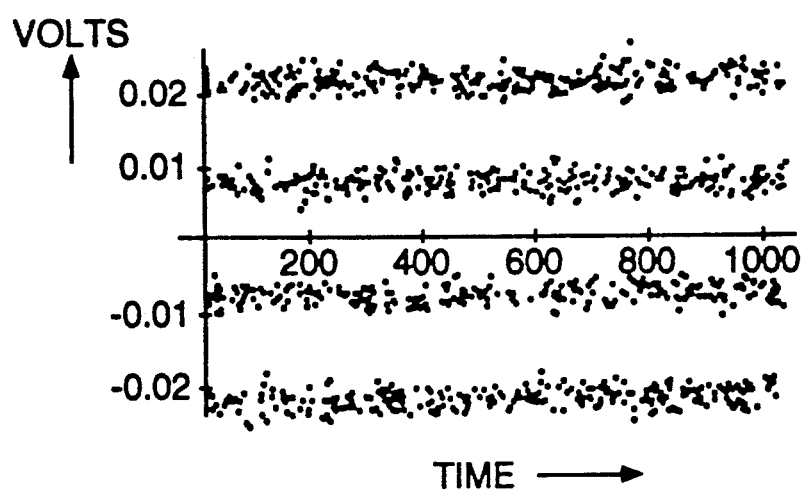
FIG. 4 represents an input signal (which has undergone transmission through a transmission channel) of the type that can be processed in accordance with the invention.
Figure 6:
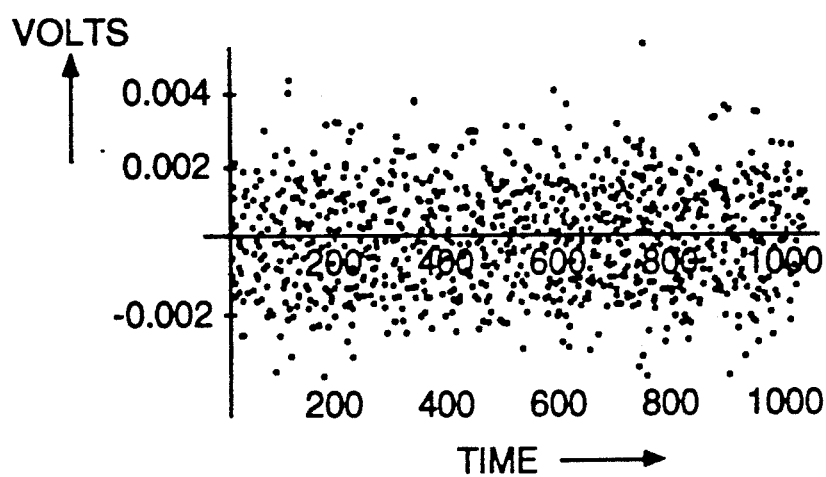
FIG. 6 represents residual noise resulting from processing the input signal of FIG. 4 in a conventional decision feedback equalizer.
Figure 7:
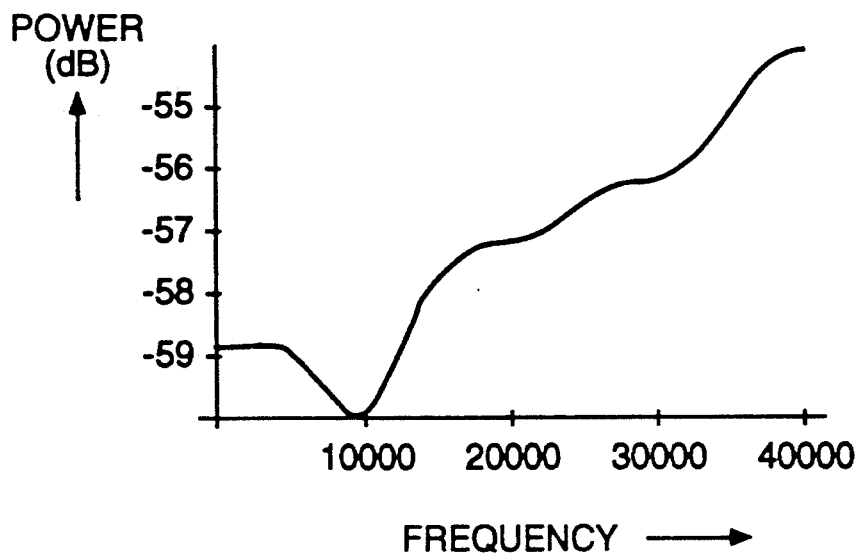
FIG. 7 represents the power spectrum of the residual noise of FIG. 6.

Assume for example that the FIG. 1 apparatus is designed to satisfy the ANSI T1,601-1988 Loop 1 standard, and it receives (at subtraction circuit 8) the signal $x(n)$ shown in FIG. 4, which is a conventional 2B1Q code signal. In response, the apparatus will output coefficients $s'(z)$ which determine the detected symbols shown in FIG. 5, and noise coefficients $e(z)$ which determine the residual noise $e(n)$ shown in FIG. 6. The signal to noise ratio is 21.58 dB. The residual noise shown in FIG. 6 has the power spectrum shown in FIG. 7, which has higher power high frequency components than low frequency components.

Figure 8:
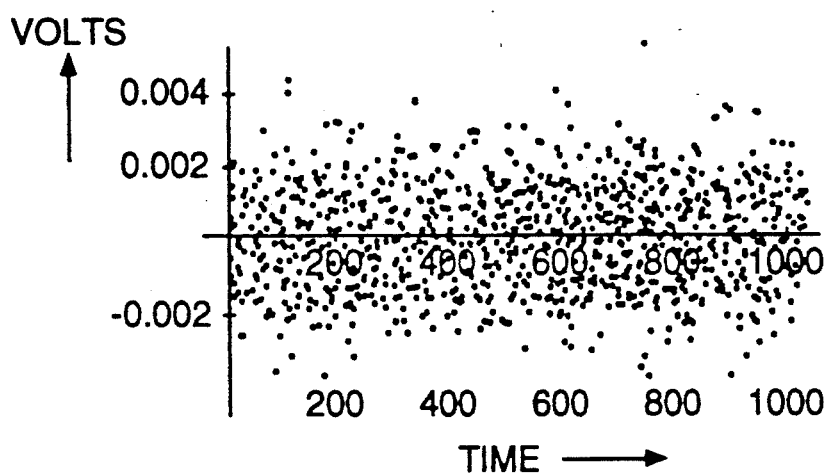
FIG. 8 represents residual noise resulting from processing the input signal of FIG. 4 in an embodiment of the inventive decision feedback equalizer.
Figure 9:
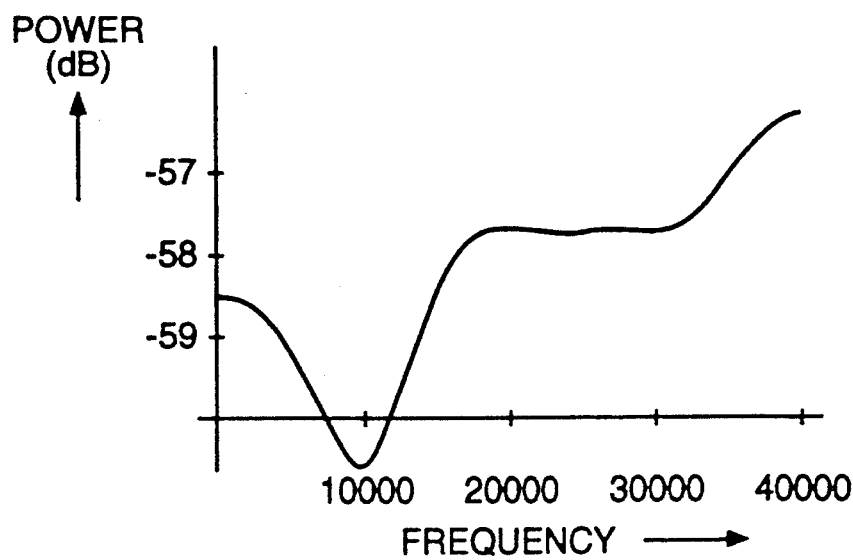
FIG. 9 represents the power spectrum of the residual noise of FIG. 8.

Assume next that the apparatus of the previous paragraph is modified in accordance with the invention to include components 28, 30, 32, 34, and 36, connected as shown in FIG. 2. Also assume that transfer functions $B(z)$ and $C(z)$ of filters 34 and 36 are chosen so that $c_1$ through $c_{n2}$ equal zero, $b_1=.25$, and $b_2$ through $b_{n1}$ equal zero, so that filters $B(z)$ and $C(z)$ act together as a finite impulse response filter $B(z)/C(z)=1+0.25/z$. Tests of this embodiment of the invention, in response to the input signal of FIG. 4, have resulted in the same detected symbols shown in FIG. 5, with residual noise $e'(n)$ as shown in FIG. 8. The resulting signal to noise ratio is improved to 22.51 dB, and the residual noise of FIG. 8 has the power spectrum shown in FIG. 9 (which is desirably flatter than that of FIG. 7).

In a variation on the embodiment of the previous paragraph, transfer functions $B(z)$ and $C(z)$ of filters 34 and 36 are chosen so that $b_1$ through $b_{n1}$ equal zero, $c_1=-(0.25)$, and $c_2$ through $c_{n2}$ equal zero, so that filters $B(z)$ and $C(z)$ act together as an infinite impulse response filter:

$$B(z)/C(z)=1/[1=0.25/z].$$

Figure 5:
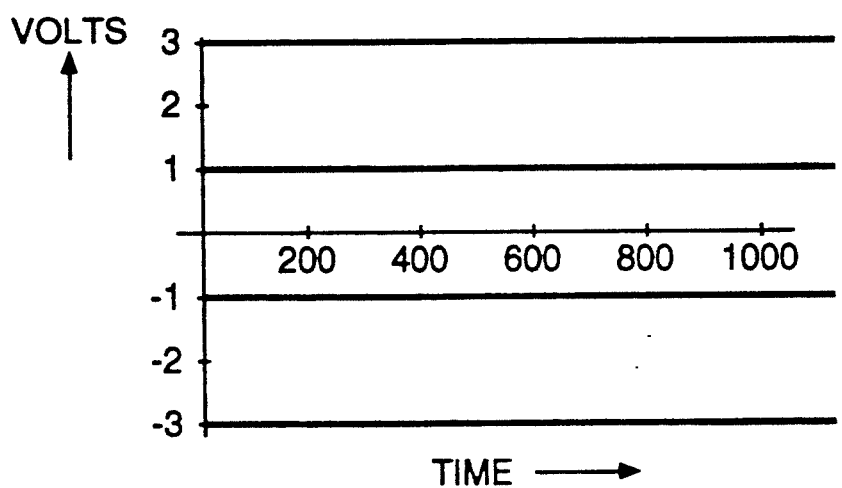
FIG. 5 represents detected symbol values which have been generated by processing the input signal of FIG. 4 in a decision feedback equalizer.
Figure 10:
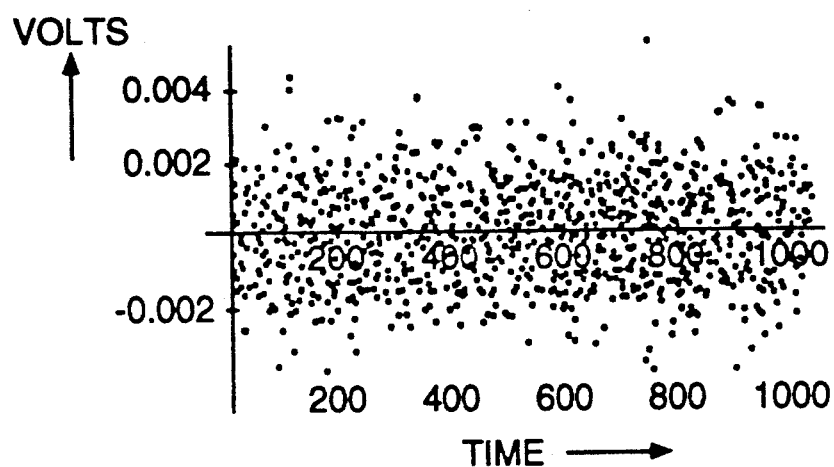
FIG. 10 represents residual noise resulting from processing the input signal of FIG. 4 in another embodiment of the inventive decision feedback equalizer.
Figure 11:
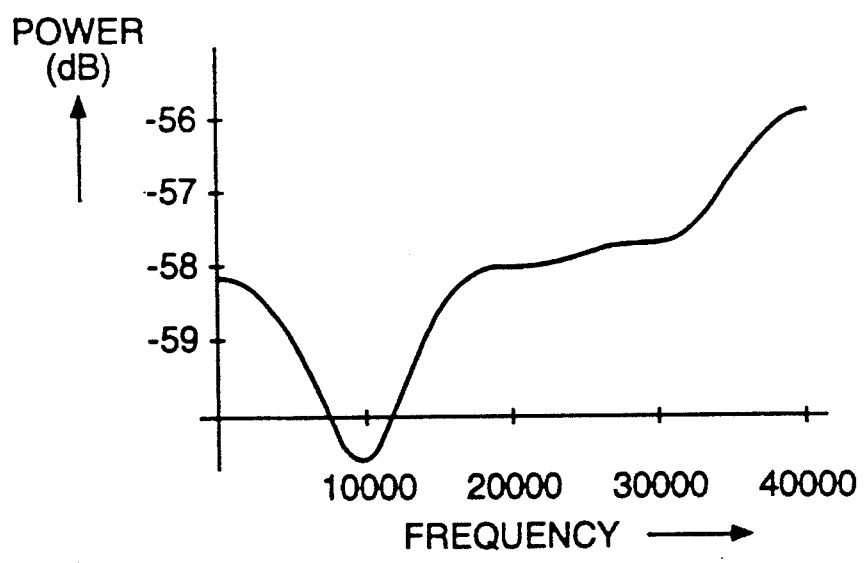
FIG. 11 represents the power spectrum of the residual noise of FIG. 10.

Tests of this embodiment of the invention, in response to the input signal of FIG. 4, have resulted in the same detected symbols as shown in FIG. 5, with residual noise $e'(n)$ as shown in FIG. 10. The resulting signal to noise ratio is improved to 22.4 dB, and the residual noise of FIG. 10 has the power spectrum shown in FIG. 11 (which is desirably flatter than that of FIG. 7).

Various modifications and alterations in the described method and apparatus of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A method for compensating for noise during decision feedback equalization, including the steps of:
   (a) performing decision feedback equalization on a noisy signal; and
   (b) while performing step (a), isolating noise components of the noisy signal, thereby generating isolated noise components, and filtering the isolated noise components to generate post-decision feedback equalization noise having a desired spectrum and power, wherein step (b) includes the steps of:
   filtering first isolated noise components of the noisy signal in a first filter having a first transfer function; and
   filtering second isolated noise components of the noisy signal in a second filter having a second transfer function, wherein $e(z)$ are the first isolated noise components, $e'(z)$ are the second isolated noise components, the first transfer function $B(2)$ and the second transfer function $C(z)$ have a combined transfer function of form $B(z)/C(z)$ wherein $B(z)=1+b_1(z)^{-1}+b_2(z)^{-2}+ \ldots +b_{n1}(z)^{-n1}$ and $C(z)=1+c_1(z)^{-1}+c_2(z)^{-2}+ \ldots +c_{n2}(z)^{-n2}$, and the first isolated noise components, the second isolated noise components, and the combined transfer function satisfy $e'(z)=(B(z)/C(z)e(z)$.

2. the method of claim 1, wherien the first transfer function has form $B(z)=1+b_1(z)^{-1}+b_2(z)^{-2}+ \ldots +b_{n1}(z)^{-1}$, and the second transfer function has form $C(z)=1+c_1(z)^{-1}+c_2(z)^{-2}+ \ldots +C_{n2}(Z)^{-n2}$, where $b_1, b_2, \ldots,$ and $c_{n2}$ are constant values.

3. A method for compensating for noise during decision feedback equalization, including the steps of:
   (a) performing decision feedback equalization on a noisy signal; and
   (b) while performing step (a), isolating noise components of the noisy signal, thereby generating isolated noise components, and filtering the isolated noise components to generate post-decision feedback equalization noise having a desired spectrum and power, wherien step (b) includes the steps of:
   filtering first isolated noise components of the noisy signal in a first filter having a first transfer function; and
   filtering second isolated noise components of the noisy signal in a second filter having a second transfer function, wherein $e(z)$ are the first isolated noise components, $e'(z)$ are the second isolated noise components, the first transfer function and the second transfer function have a combined transfer function of form $zB'(z)/C'(z)$, and the first isolated noise components, the second isolated noise components, the combined transfer function satisfy a relation $e'(z)=(zB'(z)/C'(z))e(z)$, the first transfer function has form $zB'(z)=b_1+b_2(z)^{-1}+ \ldots + b_{n1}(z)^{-(n1)+1}$, and the second transfer function has form $C'(z)=c_0+c_1(z)^{-1}+c_2(z)^{-2}+ \ldots +C_{n2}(z)^{-n2}$, where $b_1, b_2, \ldots, b_{n1}, c_1, c_2, \ldots,$ and $c_{n2}$ are constant values.

4. A decision feedback equalization apparatus, including:
   decision feedback equalization means for performing decision feedback equalization on a noisy signal; and
   a noise filter means connected to the decision feedback means, including means for isolating noise components of the noisy signal thereby generating isolated noise components, and means for filtering the isolated noise components to generate post-decision feedback equalization noise having a desired spectrum and power, wherein the noise filter means includes:
   a first filter having a first transfer function, for filtering first isolated noise components of the noisy signal; and
   a second filter having a second transfer function for filtering second isolated noise components of the noisy signal, wherein $e9z)$ are the first isolated noise components, $e'(z)$ are the second isolated noise components, the first transfer function $B(z)$ and the second transfer function $C(z)$ have a combined transfer function of form $B(z)/C(z)$ wherein $B(z)=1+b_1(z)^{-1}+b_2(z)^{-2}+ \ldots + b_{n1}(z)^{-n1}$ and $C(z)=1+c_1(z)^{-1}+c_2(z)^{-2}+ \ldots + C_{n2}(z)^{-n2}$ and the first isolated noise components, the second isolated noise components, and the combined transfer function satisfy $e'(z)=(B(z)/C(z)e(z)$.

5. The apparatus of claim 4, wherein the first transfer function has form $B(z)=1+b_1(z)^{-1}+b_2(z)^{-2}+ \ldots +b_{n1}(z)^{-n1}$, and the second transfer function has form $C(z)=1+c_1(z)^{-1}+c_2(z)^{-2}+ \ldots +c_{n2}(z)^{-n2}$, where $b_1, b_2, \ldots, b_{n1}, c_1, c_2, \ldots,$ and $c_{n2}$ are constant values.

6. A decision feedback equalization apparatus, including:
   decision feedback equalization means for performing decision feedback equalization on a noisy signal; and
   a noise filter means connected to the decision feedback means, including means for isolating noise components of the noisy signal thereby generating isolated noise components, and means for filtering the isolated noise components to generate post-decision feedback equalization noise having a desired spectrum and power, wherien the noise filter means includes:

a first filter having a first transfer function, for filtering first isolated noise components of the noisy signal; and a second filter having a second transfer function for filtering second isolated noise components of the noisy signal, whrein $e(z)$ are the first isolated noise components, $e'(z)$ are the second isolated noise components, the first transfer function and the second transfer function have a combined transfer function of form $zB'(z)/C'(z)$, and the first isolated noise components, the second isolated noise components, the combined transfer function satisfy $e'(z) = (ZB'(z)/C'(z))e(z)$, the first transfer function has form $zB'(z) = b_1 + b_2(z)^{-1} + \ldots + b_{n1}(z)^{-(n1)+1}$, and the second transfer function has form $C'(z) = c_0 + c_1(z)^{-1} + c_2(z)^{-2} + \ldots + C_{n2}(z)^{-n2}$, where $b_1, b_2, \ldots, b_{n1}, c_1, c_2, \ldots,$ and $C_{hd\ n2}$ are constant values.

7. An apparatus for performing decision feedback equalization on a receive filtered signal $x(n)$ resulting from filtration of a transmitted signal in a feedforward filter, wherein the transmitted signal has resulted from transmission of an input signal through a transmission channel, said apparatus including:

a subtraction circuit for receiving the receive filtered signal $x(n)$ and subtracting a replica signal $x'(n)$ therefrom to generate a signal $y(n)$;

noise filter means for generating a corrected signal $y'(n)$ from the signal $y(n)$, wherein the corrected signal $y'(n)$ includes post-decision feedback equalization noise having a desired spectrum and power;

a quantizer for receiving the corrected signal $y'(n)$ and generating a second replica signal $s''(n)$ in response to the corrected signal $y'(n)$, wherein the second replica signal $s''(n)$ is a replica of the input signal; and feedback filter means for receiving the second replica signal $s''(n)$ and generating the replica signal $x'(n)$ in response thereto, and providing replica signal $x'(n)$ to the subtraction circuit.

8. The apparatus of claim 7, wherein the noise filter means includes:

a first isolation means for isolating noise components of the signal $y(n)$;

a first noise filter having a first transfer function, for generating a first noise compensation signal $e1(n)$ by filtering the noise components of the signal $y(n)$;

a second isolation means for isolating noise components of the corrected signal $y'(n)$;

a second noise filter having a second transfer function, for generating a second noise compensation signal $e2(n)$ by filtering the noise components of the corrected signal $y'(n)$; and means for combining the first noise compensation signal $e1(n)$ and the second noise compensation signal $e2(n)$ with the signal $y(n)$, thereby generating said corrected signal $y'(n)$.

9. The apparatus of claim 8, wherein the first isolation means includes:

a dummy quantizer for receiving the signal $y(n)$ and generating a third replica signal $s'(n)$ therefrom; and means for processing the signal $y(n)$ and the third replica signal $s'(n)$ to generate the noise components of the signal $y(n)$.

10. The apparatus of claim 9, wherein the first transfer function has form $B(z) = 1 + b_1(z)^{-1} + b_2(z)^{-2} + \ldots + b_{n1}(z)^{-n1}$, and second transfer function has the form $C(z) = 1 + c_1(z)^{-1} + c_2(z)^{-2} + \ldots + c_{n2}(z)^{-n2}$, where $b_1, b_2, \ldots, b_{n1}, c_1, c_2, \ldots,$ and $c_{n2}$ are constant values.

11. The apparatus of claim 8, wherein the first isolation means inlcudes:

a phase delay filter for receiving the signal $y(n)$ and generating phase delayed signal therefrom; and means for processing the phase delayed signal and the second replica signal $s''(n)$ to generate the noise components of the signal $y(n)$.

12. The apparatus of claim 11, wherein the phase delay filter has a transfer function having form $1/z$, the first transfer function has form $zB'(z) = b_1 + b_2(z)^{-1} + \ldots + b_{n1}(z)^{-(n1)+1}$, and the second transfer function has form $C'(z) = c_0 + c_1(z)^{-1} + c_2(z)^{-2} + \ldots + c_{n2}(z)^{-n2}$, where $b_1, b_2, \ldots, b_{n1}, c_1, c_2, \ldots,$ and $c_{n2}$ are constant values.

* * * * *

UNITED STATES PATENT AND TRADEMARK OFFICE
CERTIFICATE OF CORRECTION

PATENT NO. : 5,327,460
DATED : July 5, 1994
INVENTOR(S) : Roy George Batruni

It is certified that error appears in the above-indentified patent and that said Letters Patent is hereby corrected as shown below:

In Col. 9, line 50, replace "B(2)" with --B(z)--;
In Col. 9, line 58, replace "(B(z)/C(z)e(z)" with --B(z)/C(z))e(z)--;
In Col. 9, line 59, capitalize the first "t" of the sentence;
In Col. 9, line 59, replace "wherien" with --wherein--;
In Col. 9, line 61, replace "+$b_{n1}(z)^{-1}$" with --+$b_{n1}(z)^{-n1}$--;
In Col. 9, line 63, replace "$b_1$, $b_2$, ..., and $c_{n2}$" with --$b_1$, $b_2$, ..., $b_{n1}$, $c_1$, $c_2$, ..., and $c_{n2}$--;
In Col. 10, line 11, replace "e' (z)" with --e'(z)--;
In Col. 10, line 17, replace "(zB'(z)/C(z))e(z)" with --e'(z)=(B(z)/C(z))e(z)--.
In Col. 10, line 41, replace "e9z)" with --e(z)--;
In Col. 10, line 47, replace "$C_{n2}(z)^{-n2}$" with --$c_{n2}(z)^{-n2}$,--;
In Col. 10, line 50, replace "(B(z)/C(z)e(z)" with --(B(z)/C(z))e(z)--;
In Col. 11, line 1, replace "wherien" with --wherein--;
In Col. 11, line 8, replace "whrein" with --wherein--;
In Col. 11, line 16, replace "(ZB'(z)/C'(z))e(z)" with --(zB'(z)/C'(z))e(z)--;
In Col. 11, line 18, replace "$C_1$" by --$c_1$--;
In Col. 11, line 18, replace "$C_{n2}$" by --$c_{n2}$--;
In Col. 11, line 20, replace "Chd n2" with --$c_{n2}$--; and

UNITED STATES PATENT AND TRADEMARK OFFICE
CERTIFICATE OF CORRECTION

PATENT NO. : 5,327,460
DATED : July 5, 1994
INVENTOR(S) : Roy George Batruni

It is certified that error appears in the above-indentified patent and that said Letters Patent is hereby corrected as shown below:

Column 12, line 32, replace "inlcudes" with --includes--.

Signed and Sealed this

Twenty-seventh Day of September, 1994

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,327,460
DATED : July 5, 1994
INVENTOR(S) : Roy George Batruni

It is certified that error appears in the above-indentified patent and that said Letters Patent is hereby corrected as shown below:

In Col. 10, line 17, replace "$e'(z)=(zB(z)/C(z))e(z)$" with --$e'(z)=(zB'(z)/C'(z))e(z)$--

Signed and Sealed this

Twenty-first Day of May, 1996

Attest:

BRUCE LEHMAN

*Attesting Officer*    *Commissioner of Patents and Trademarks*